United States Patent [19]
Lamphron et al.

[11] Patent Number: 5,771,401
[45] Date of Patent: Jun. 23, 1998

[54] ONE-TIME-USE CAMERA WITH TRANSLATION-TO-ROTATION CONVERTER WHICH IS TRANSLATED FIRST TO ROTATE LIGHT LOCK OF FILM CASSETTE CLOSED AND THEN TO EJECT CASSETTE FROM CAMERA

[75] Inventors: Mark A. Lamphron, Rochester; David Cipolla, Pittsford, both of N.Y.

[73] Assignee: Eastman Kodak Company, Rochester, N.Y.

[21] Appl. No.: 873,659

[22] Filed: Jun. 12, 1997

[51] Int. Cl.⁶ .................................................. G03B 17/02
[52] U.S. Cl. .............................................. 396/6; 396/538
[58] Field of Search .............................. 396/6, 513, 535, 396/538

[56] References Cited

U.S. PATENT DOCUMENTS 5,452,036  9/1995  Kamata .
5,452,038  9/1995  Csaszar et al. .
5,550,608  8/1996  Smart et al. .
5,555,063  9/1996  Balling .
5,579,070  11/1996  Smart et al. .
5,669,018  9/1997  Kamata ........................................ 396/6

Primary Examiner—Howard B. Blankenship
Attorney, Agent, or Firm—Roger A. Fields

[57] ABSTRACT

A one time-use camera comprising a film cassette with a light lock that is to be rotated closed after an exposed filmstrip is wound into the cassette, and a driver which initially is rotated to rotate the light lock closed and then is translated to eject the cassette with its light lock closed from the camera, is characterized in that the driver is a translation-to-rotation converter which when initially translated is rotated in response to translation to rotate the light lock closed without translating the cassette and then when further translated is translated without being rotated to eject said cassette with its light lock closed from the camera.

9 Claims, 4 Drawing Sheets

ONE-TIME-USE CAMERA WITH TRANSLATION-TO-ROTATION CONVERTER WHICH IS TRANSLATED FIRST TO ROTATE LIGHT LOCK OF FILM CASSETTE CLOSED AND THEN TO EJECT CASSETTE FROM CAMERA

FIELD OF THE INVENTION

The invention relates generally to the field of photography, and in particular to one-time-use cameras. More specifically, the invention relates to a one-time-use camera with a translation-to-rotation converter which is translated first to rotate a light lock of a film cassette closed and then to eject the cassette from the camera.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional 35 mm film cassette in a cassette receiving chamber, a film take-up spool in a film supply chamber, a fixed-focus taking lens, a film metering mechanism with a rotatably supported metering sprocket that engages the filmstrip, a manually rotatable thumbwheel rotatably engaged with a film spool inside the film cassette, a single-blade shutter, a manually depressible shutter release button, a rotatable frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each time a picture is taken with the one-time-use camera,, the photographer manually rotates the thumbwheel in a film winding direction to similarly rotate the film spool inside the film cassette. This winds an exposed section of the filmstrip into the film cassette. The rewinding movement of the filmstrip the equivalent of slightly more than one frame width rotates the metering sprocket in engagement with the filmstrip to decrement the frame counter to its next lower-numbered setting, and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and wound into the film cassette, the one-time-use camera is given to a photofinisher who tears the outer box off the camera unit, separates the rear cover part from the main body part, and removes the film cassette with the exposed filmstrip from the cassette receiving chamber. Then, he removes the exposed filmstrip from the film cassette to develop the negatives and make prints for the customer, and he forwards the used camera parts to the manufacturer for recycling, i.e. remanufacture.

The conventional cassette typically used in the one-time-use camera has a light-trapping plush arranged within a film egress/ingress slot to prevent ambient light from entering the cassette interior through the slot. Thus, when the film cassette is removed from camera, the exposed filmstrip inside the film cassette is protected from being fogged.

As contrasted with the conventional cassette, prior art U.S. Pat. No. 5,357,303 issued Oct. 18, 1994 discloses a new-type cassette having a spool rotatable in a film winding direction to wind an exposed filmstrip including a trailing film end portion into the film cassette, and a light lock rotatable to be closed after the trailing film end portion has been wound into the film cassette. The new-type cassette can be used in a one-time-use camera. For example, prior art U.S. Pat. Nos. 5,600,395 issued Feb. 4, 1997 and 5,614,976 issued Mar. 25, 1997 each discloses a one-time-use camera for use with the new-type cassette. The new-type camera comprises a thumbwheel manually rotatable in the film winding direction in engagement with the cassette spool to similarly rotate the cassette spool in order to wind the exposed filmstrip including the trailing film end portion into the film cassette, and a closing driver engaged with the light lock to be spring-rotated to begin to rotate the light lock closed when a film sensor senses that the trailing film end portion has been wound into the film cassette. The thumbwheel is coupled with the closing driver to further rotate the closing driver in order to completely rotate the light lock closed when the thumbwheel is further rotated in the film winding direction. Once the light lock is closed, the exposed filmstrip inside the film cassette is protected from ambient light. Thus, the film cassette can be removed from the camera without fear of fogging the exposed filmstrip.

Alternatively, several patents suggest that a manual tool be used to first rotate the closing driver to rotate the light lock completely closed and then to translate the closing driver to forcibly eject the film cassette from the new-type camera. For example, in prior art U.S. Pat. No. 5,579,070 issued Nov. 26, 1996, after the filmstrip including the trailing film end portion is wound into the film cassette, the manual tool is rotated in engagement with the closing driver to rotate the closing driver to rotate the light lock closed. Then, the manual tool is translated to push the closing driver with the film cassette out of the camera. Thus, two different types of movement of the manual tool are required, i.e. rotation followed by translation.

Another patent, prior art U.S. Pat. No. 5,452,036 issued Sep. 19, 1995, suggests that a stationary pin on the rear cover part of the new-type camera project into a helical cam groove in the light lock. When the film cassette is removed from the camera, the pin and groove interact to rotate the light lock closed. In this instance, the film cassette appears to be partially pulled out of the camera before the light lock is completely closed. Thus, ambient light might fog the exposed filmstrip inside the film cassette.

SUMMARY OF THE INVENTION

According to the invention, a one time-use camera comprising a film cassette with a light lock that is to be rotated closed after an exposed filmstrip is wound into the cassette, and a driver which initially is rotated to rotate the light lock closed and then is translated to eject the cassette with its light lock closed from the camera, is characterized in that:

the driver is a translation-to-rotation converter which when initially translated is rotated in response to translation to rotate the light lock closed without translating the cassette and then when further translated is translated without being rotated to eject said cassette with its light lock closed from the camera.

More specifically, the converter has an engaging stem arranged in rotational engagement with the light lock to rotate the light lock closed when the converter is rotated in response to being initially translated, and a clearance space is provided between the engaging stem and the light lock to prevent translational engagement of the engaging stem with the light lock in order to permit the converter to be initially translated without translating the cassette. However, the clearance space is dimensioned to cause the engagement stem to bottom out in the clearance space, when the converter is translated a distance sufficient to be rotated to rotate the light lock closed, in order to permit further translation of the converter to eject the cassette from the camera.

If a manual tool is used to operate the converter, only one type of movement, i.e. translation, of the manual tool is required as compared to prior art U.S. Pat. No. 5,579,070 which requires two different types of movement of the manual tool, i.e. rotation followed by translation. Moreover, there is no chance of the film cassette being partially moved out of the camera before the light lock is completely closed, as in prior art U.S. Pat. No. 5,452,036.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Film Cassette

Figure 1:
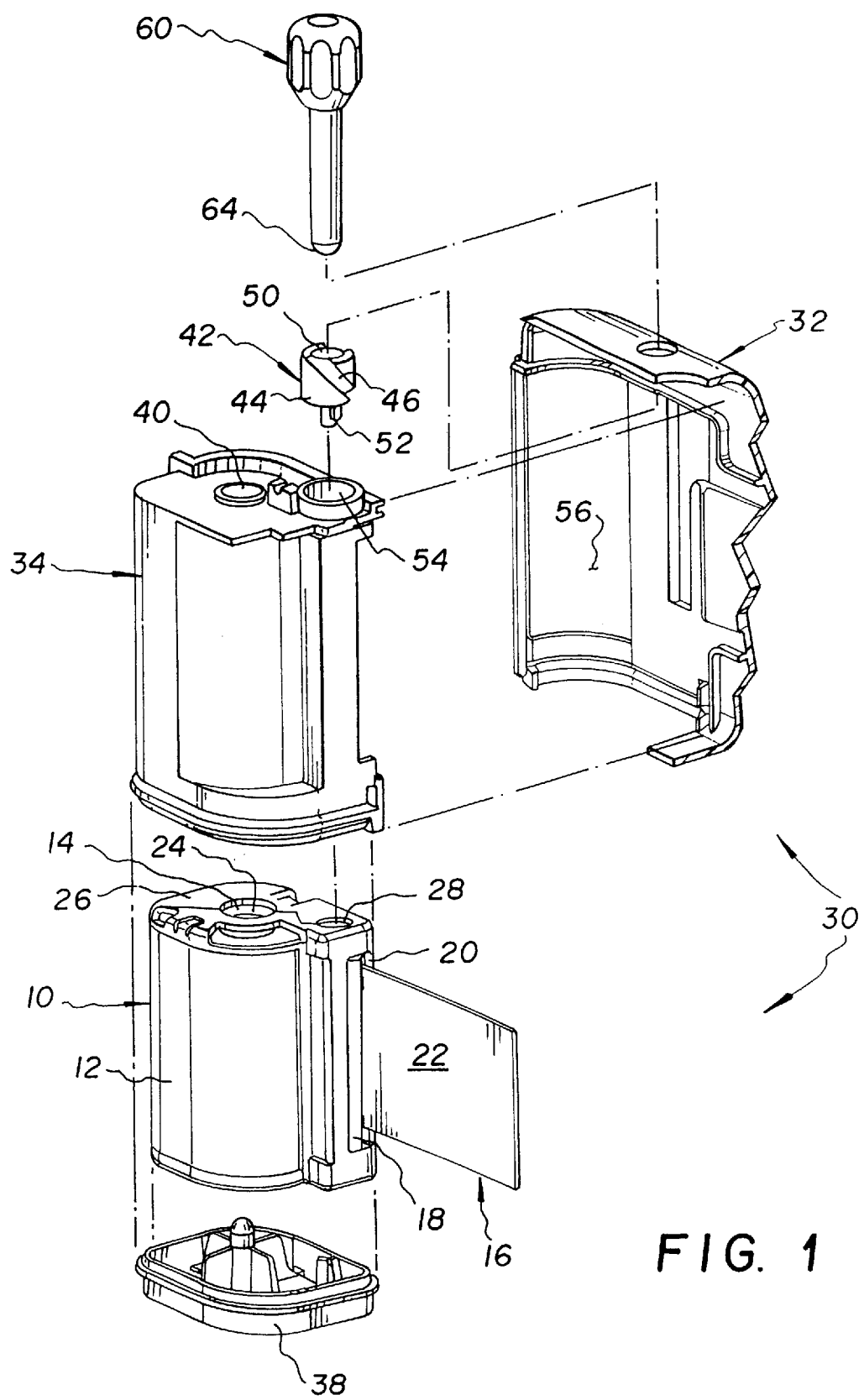
FIG. 1 is an exploded perspective view of a partially shown one-time-use camera pursuant to a preferred embodiment of the invention, depicting a translation-to-rotation converter which is translated first to rotate the light lock of the film cassette closed and then to eject the cassette from the camera.

Referring now to the drawings, FIG. 1 shows a film cassette 10 similar in operation to ones disclosed in prior art U.S. Pat. Nos. 5,357,303, issued Oct. 18, 1994, and 5,231,438, issued Jul. 27, 1993. The film cassette 10 includes a cassette shell 12 that contains a flanged spool 14 on which is to be wound an exposed filmstrip 16. A slightly elastic light lock 18 is supported within a film slot 20 in the cassette shell 12 to be pivoted open to permit film movement into the shell, through the slot, and to be pivoted closed to prevent ambient light from entering the shell, through the slot.

FIG. 1 shows the film cassette 10 with the light lock 18 open and all but a trailing film end portion 22 of the exposed filmstrip 16 wound into the cassette shell 12. The light lock 18 is closed after the exposed filmstrip 16 including the trailing film end portion 22 is wound into the cassette shell 12.

The spool 14 has a coaxial drive cavity 24 accessible at a drive end 26 of the cassette shell 12 and the light lock 18 has a coaxial drive cavity 28 accessible at the same end of the cassette shell. See FIGS. 1 and 2.

One-Time-Use Camera

Figure 2:
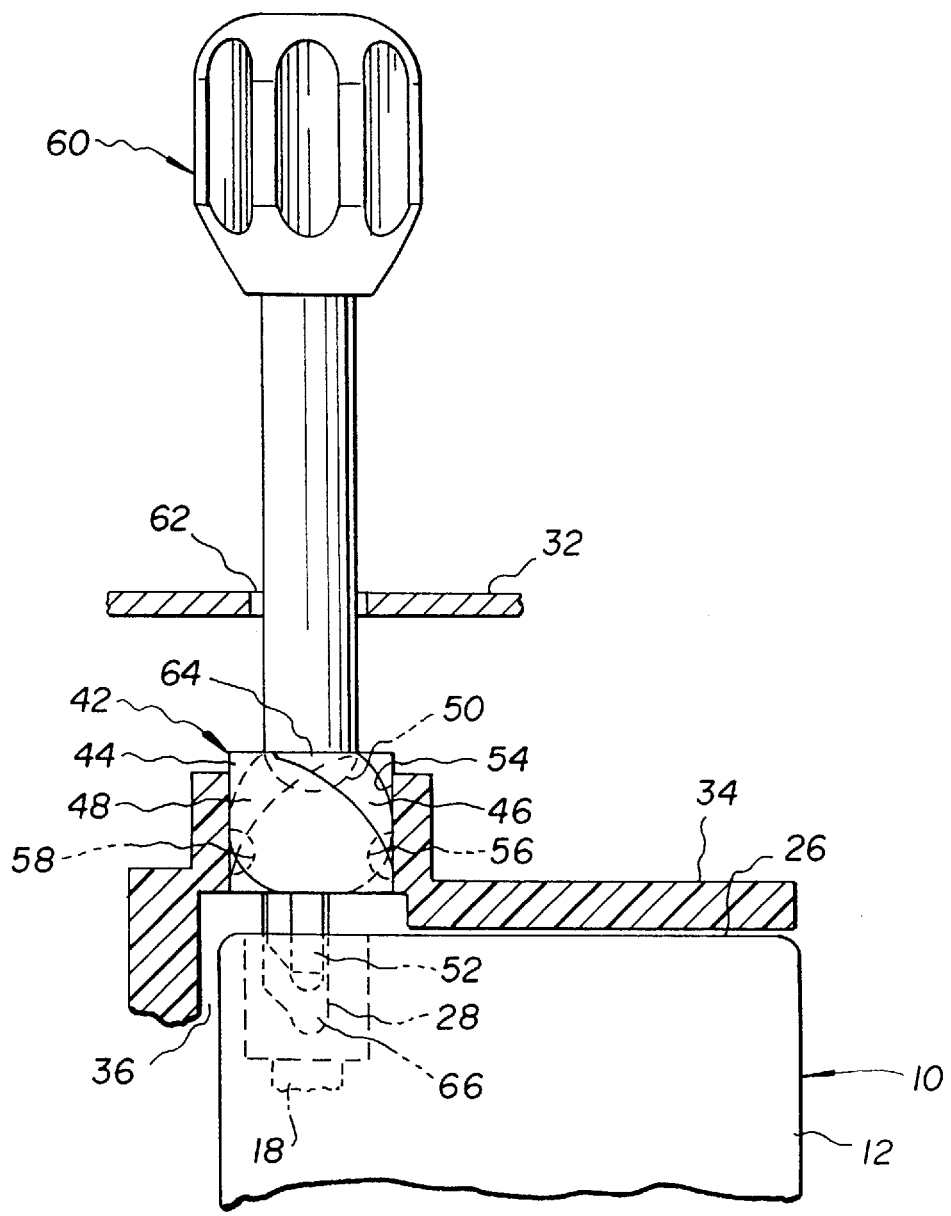
FIGS. 2 and 3 are elevation views depicting use of a manual tool to operate the translation-to-rotation converter.
Figure 3:
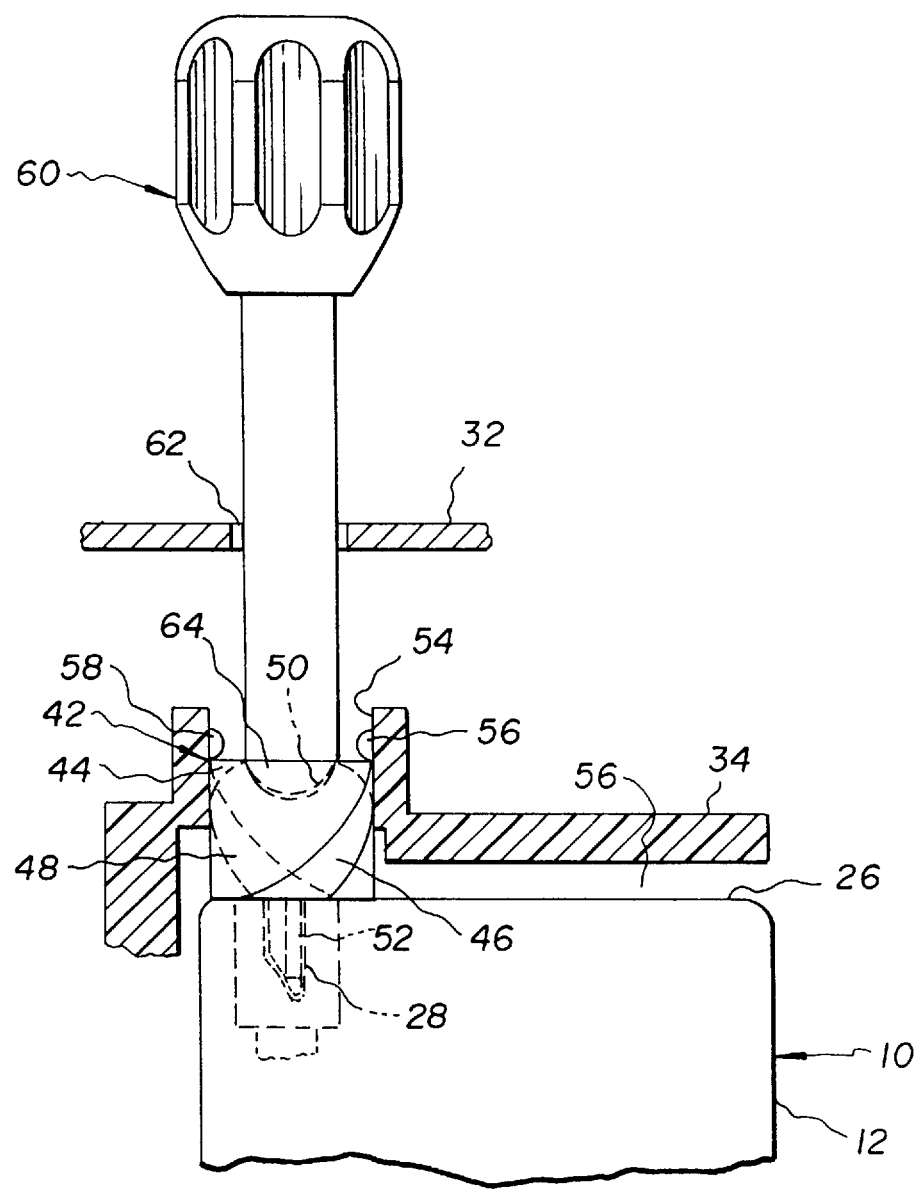
Figure 4:
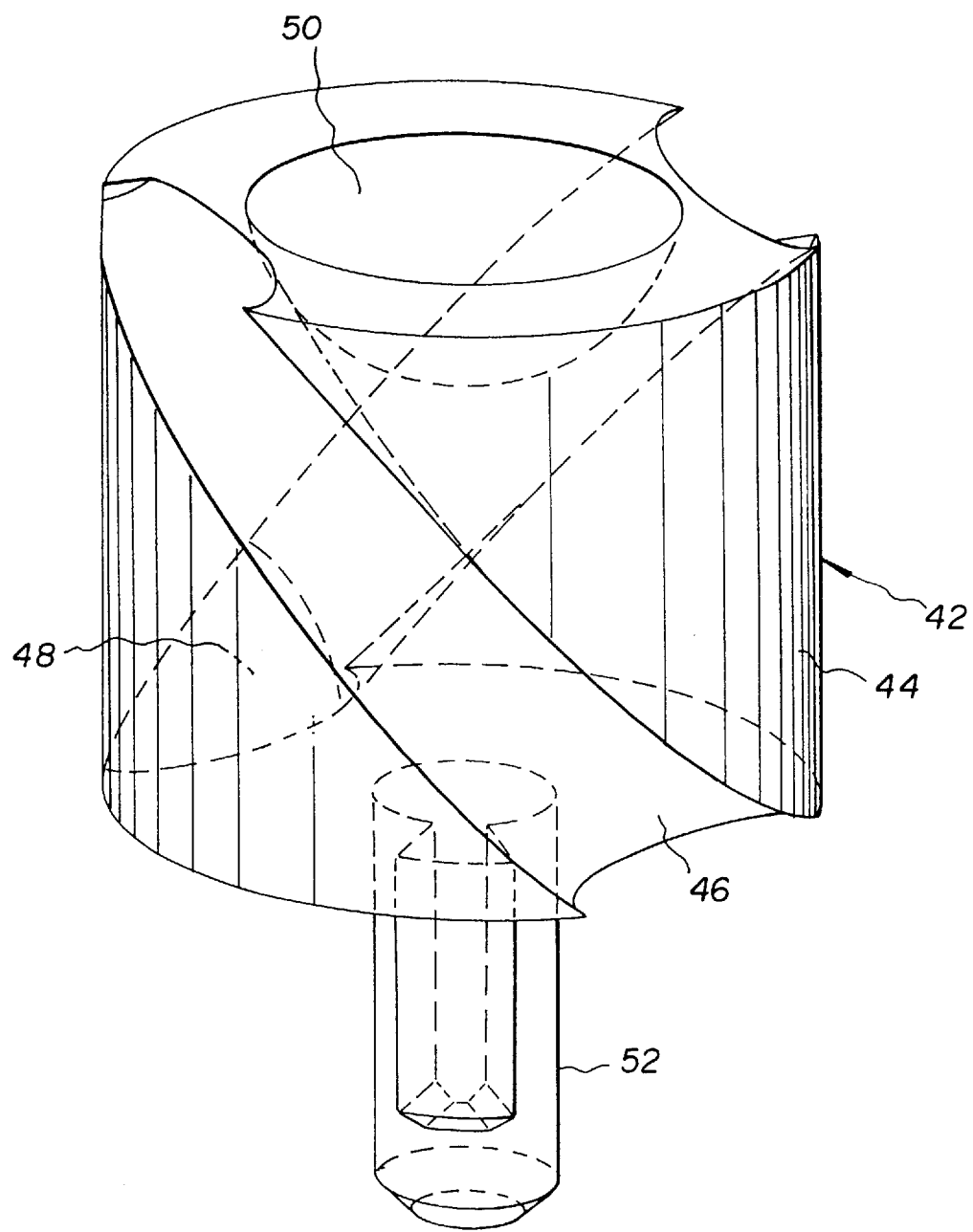
FIG. 4 is an enlarged perspective view of the translation-to-rotation converter.

A partially shown one-time-use camera 30 which includes the film cassette 10 is depicted in FIGS. 1–3.

The camera 30 comprises a rear cover part 32 and a main body part 34 connected to the main body part to form a light-tight unit. The rear cover part 32 and the main body part 34, when connected together, define a cassette chamber 36 for the film cassette 10. See FIG. 1. A removable snap-in lid 38 seals the cassette chamber 36 at its bottom.

An ingress hole 40 in the main body part 34 is aligned with the drive cavity 24 of the spool 14 to permit the drive stem of a thumbwheel (not shown) to extend through the ingress hole into the drive cavity to be in rotational engagement with the spool. Rotation of the thumbwheel counter-clockwise in FIG. 1 similarly rotates the spool 14 to wind the exposed filmstrip 16 including its trailing film end portion 22 into the cassette shell 12.

As shown in FIGS. 1–4, a translation-to-rotation driver converter 42 comprises a cylindrical shaped body 44 having a pair of similar length helical cam grooves 46 and 48 that are spaced 180 degrees apart and a top recess 50, and an engaging stem 52 which depends coaxially from the body. The body 44 of the driver converter 42 is positioned for rotation and translation within a bore 54 in the main body part 34, and the engaging stem 52 of the driver converter extends part-way into the drive cavity 28 of the light lock 18 to be in rotational engagement with the light lock. See FIG. 2. A pair of fixed identical protuberances 56 and 58 spaced 180 degrees apart project from the main body part 34 into the respective grooves 46 and 48, within the bore 54. The protuberances 56 and 58 interact with the respective grooves 46 and 48 to cause the converter 42 to be immediately rotated counter-clockwise in FIGS. 1–3 in the bore 54 in response to being initially translated downward in the bore. Rotation of the converter 42 counter-clockwise similarly rotates the light lock 18 to close the light lock, after the exposed filmstrip 16 including its trailing film end portion 22 is wound into the cassette shell 12.

When a manual tool 60 is inserted through an ingress hole 62 in the rear cover part 32 which is aligned with the bore 54 in the main body part 34, a forward end 64 of the tool is received in the top recess 50 in the body 44 of the converter 42. If the tool 60 is manually pushed down to initially translate the converter 44 downward in the bore 54, the converter will be immediately rotated in the bore to rotate the light lock 18 completely closed. See FIGS. 2 and 3. A clearance space 66 is provided in the drive cavity 28 of the light lock 18, between the engaging stem 52 and the light lock, to prevent translational engagement of the engaging stem with the light lock. This permits the converter 42 to be translated downward in the bore 54 without having to translate the film cassette 10 downward in the cassette chamber 36. The clearance space 66 is dimensioned to cause the engagement stem 52 to bottom out in the drive cavity 28 of the light lock 18 when the converter 42 has been translated a distance sufficient to be rotated to rotate the light lock completely closed. If the tool 60 is then pushed down to further translate the converter 44 downward in the bore 54, the respective grooves 46 and 48 will separate from the protuberances 56 and 58 as shown in FIG. 3, discontinuing rotation of the converter, i.e. permitting only translation of the converter. Thus, further movement of the tool 60 to translate the converter 42 downward in the bore 54 will eject the converter from the bore and, simultaneously, will translate the film cassette 10 downward in the cassette chamber 36 to force the film cassette to pop the lid 38 away from the cassette chamber. Consequently, the converter 42 and the film cassette 10 will drop out of the cassette chamber 36.

The invention has been described with reference to a preferred embodiment. However, it will be appreciated that variations and modifications can be effected by a person of ordinary skill in the art without departing from the scope of the invention.

PARTS LIST 10. film cassette
12. cassette shell
14. spool
16. exposed filmstrip
18. light lock
20. film slot
22. trailing film end portion
24. drive cavity
26. drive end
28. drive cavity
30. one-time-use camera
32. rear cover part
34. main body part
36. cassette chamber
38. lid
40. ingress hole
42. translation-to-rotation driver converter
44. body
46. helical cam groove
48. helical cam groove
50. top recess
52. engaging stem
54. bore
56. protuberance
58. protuberance
60. tool
62. ingress opening
64. forward end
66. clearance space

What is claimed is:

1. A one-time-use camera comprising a film cassette with a light lock that is to be rotated closed after an exposed filmstrip is wound into said cassette, and a driver which is rotated to rotate said light lock closed before removing said cassette from said camera, is characterized in that:

said driver is a translation-to-rotation converter which when translated is rotated in response to translation to rotate said light lock closed without translating said cassette.

2. A one-time-use camera as recited in claim 1, wherein said converter has an engaging stem arranged in rotational engagement with said light lock to rotate the light lock closed when the converter is rotated in response to being translated, and a clearance space is provided between said engaging stem and said light lock to prevent translational engagement of the engaging stem with the light lock in order to permit said converter to be translated without translating said cassette.

3. A one-time-use camera as recited in claim 2, wherein said clearance space is dimensioned to cause said engaging stem to bottom out in the clearance space when said converter is translated a distance sufficient to be rotated to rotate said light lock closed.

4. A one-time-use camera as recited in claim 3, wherein said converter has a pair of helical cam grooves spaced 180 degrees apart, and a pair of fixed protuberances project into said respective grooves to cause said converter to be rotated in response to being translated.

5. A camera comprising a driver which is rotated to rotate a light lock of a film cassette closed before removing the cassette from said camera, is characterized in that:

said driver is a translation-to-rotation converter which when translated is rotated in response to translation to rotate the light lock of the film cassette closed without translating the cassette.

6. A one-time-use camera comprising a film cassette with a light lock that is to be rotated closed after an exposed filmstrip is wound into said cassette, and a driver which initially is rotated to rotate said light lock closed and then is translated to eject said cassette with its light lock closed from said camera, is characterized in that:

said driver is a translation-to-rotation converter which when initially translated is rotated in response to translation to rotate said light lock closed without translating said cassette and then when further translated is translated without being rotated to eject said cassette with its light lock closed from said camera.

7. A one-time-use camera as recited in claim 6, wherein said converter has an engaging stem arranged in rotational engagement with said light lock to rotate the light lock closed when the converter is rotated in response to being initially translated, and a clearance space is provided between said engaging stem and said light lock to prevent translational engagement of the engaging stem with the light lock in order to permit said converter to be initially translated without translating said cassette, but is dimensioned to cause said engagement stem to bottom out in said clearance space when the converter is translated a distance sufficient to be rotated to rotate the light lock closed in order to permit further translation of the converter to eject said cassette from said camera.

8. A one-time-use camera as recited in claim 7, wherein said converter has a pair of helical cam grooves spaced 180 degrees apart, and a pair of fixed protuberances project into said respective grooves to cause said converter to be rotated to rotate said light lock closed in response to being initially translated and separate from the respective grooves when the converter is further translated to eject said cassette from said camera.

9. A one-time-use camera as recited in claim 8, wherein said converter is supported to be ejected with said cassette from said camera when said fixed protuberances are separated from said respective grooves.

* * * * *